(12) United States Patent
Beck

(10) Patent No.: US 7,306,079 B2
(45) Date of Patent: Dec. 11, 2007

(54) SUSPENSION SYSTEM FOR MOTOR VEHICLES

(75) Inventor: Hubert Beck, Eitorf (DE)

(73) Assignee: ZF Sachs AG, Eitorf (DE)

( * ) Notice: Subject to any disclaimer, the term of this patent is extended or adjusted under 35 U.S.C. 154(b) by 540 days.

(21) Appl. No.: 10/779,301

(22) Filed: Feb. 13, 2004

(65) Prior Publication Data

US 2004/0201185 A1 Oct. 14, 2004

(30) Foreign Application Priority Data

Feb. 14, 2003 (DE) ................ 103 06 109

(51) Int. Cl.
*F16F 9/54* (2006.01)

(52) U.S. Cl. ............... 188/322.2; 188/322.21; 188/322.19; 207/64.17

(58) Field of Classification Search ........... 188/322.19, 188/322.2, 322.21
See application file for complete search history.

(56) References Cited

U.S. PATENT DOCUMENTS

| | | | | |
|---|---|---|---|---|
| 3,627,348 A * | 12/1971 | Klees | ............... | 280/6.159 |
| 3,945,663 A * | 3/1976 | Duckett | ............... | 280/6.159 |
| 4,813,519 A * | 3/1989 | Matsubara et al. | ...... | 188/266.4 |
| 4,902,034 A * | 2/1990 | Maguran et al. | .......... | 188/266.6 |
| 5,219,152 A * | 6/1993 | Derrien et al. | ........... | 267/64.15 |
| 6,389,341 B1 * | 5/2002 | Davis | ......................... | 701/37 |
| 6,474,629 B2 * | 11/2002 | Beck et al. | ............... | 267/64.16 |
| 6,494,441 B2 * | 12/2002 | Beck et al. | ............... | 267/64.16 |
| 6,553,761 B2 * | 4/2003 | Beck | ......................... | 60/477 |
| 2001/0032462 A1 * | 10/2001 | Beck | ......................... | 60/477 |

\* cited by examiner

*Primary Examiner*—Robert A. Siconolfi
*Assistant Examiner*—Mariano Sy
(74) *Attorney, Agent, or Firm*—Cohen Pontani Lieberman & Pavane LLP

(57) ABSTRACT

A suspension system for a motor vehicle body having a level regulating device for setting a predetermined height of the motor vehicle body includes an outer tube and at least one piston-cylinder assembly arranged in the outer tube and having a working cylinder, a piston rod and a damping piston having damping valves. The suspension system further includes an oil reservoir with inflow and outflow lines for conducting a flow of oil between the oil reservoir and the at least one piston-cylinder assembly. A pump including a pump piston and a drive is arranged for pumping oil through the inflow and outflow lines for setting the predetermined height of the motor vehicle body. To connect the pump, a base is sealingly arranged on the outer tube, wherein the pump is connectable to the base in at least two operative positions.

8 Claims, 6 Drawing Sheets

SUSPENSION SYSTEM FOR MOTOR VEHICLES

BACKGROUND OF THE INVENTION

1. Field of the Invention

The invention relates to a suspension system for motor vehicles having a level regulator for setting a predetermined height of the vehicle body, the level regulator including at least one piston-cylinder assembly having a working cylinder, a piston rod and a damping piston with damping valves, a pump, an oil reservoir and appropriate inflow and outflow lines between the oil reservoir and the piston-cylinder assembly, the pump being composed of a pump piston and a drive and being attached to the outer tube of the piston-cylinder assembly.

2. Description of the Related Art

Suspension systems for motor vehicles having a level regulating means for setting a predetermined height of the vehicle body are already known, for example, from U.S. Pat. No. 6,553,761. In this reference, a pump with a drive unit is attached by flanges to the outer tube of the piston-cylinder assembly. The pump, together with the drive unit, may be used in level regulating elements with a pump rod (see FIG. 1 of the reference) or without a pump rod (see FIG. 2 of the reference). Pressure which pushes the piston rod outward for the purpose of regulating the level is generated within the piston-cylinder assembly.

A disadvantage of this prior art device is that there is no possibility for fastening the pump, together with the drive unit, in a variable fashion, that is to say in different positions, to the outer tube. A further disadvantage is that the components which are necessary for the level regulating element may only be mounted with difficulty within the outer tube.

SUMMARY OF THE INVENTION

The object of the present invention is to provide a suspension system for motor vehicles in which the pump, together with the drive unit, are connectable to the piston-cylinder assembly without making changes and are securable in various positions.

To achieve this object, the present invention provides a base which is sealed with respect to the outer tube. The base is arranged on the outer tube and the pump is capable of being fastened to this base in more than one position.

The base may be, at least partially, welded to the outer tube. More specifically, the base may be spot welded to the outer tube.

Securing the base to the outer tube, the base being secured here by means of a welded connection, provides the option of allowing the pump to be fastened, together with the drive unit, on this base in various alternative positions.

A satisfactory seal is achieved by arranging the seals for the connections between the pump and the base.

The position may be reconfigured without difficulty by virtue of the fact that the pump is screwed to the base.

To ensure that the mounting operation is low in complexity in each desired position, at least one duct is provided in the pump for each fastening position. The ducts are arranged so that after the pump is mounted on the base in one fastening position, the duct which is used for the flow connection in that fastening position is connected and all the other ducts end at the base as blind lines. All the flow connections are provided with seals. At the same time satisfactory seals are provided to produce the flow connection. When a flow connection is not present, the seal is sealed directly with respect to the base without a flow connection being formed, i.e., the line is a blind line. Each duct may, however, become the flow connection again when the mounting position changes.

The components of the pump and drive unit which are necessary for the suspension system and which are located between the outer tube and the working cylinder are easily mounted by virtue of the fact that the inner wall of the outer tube runs in a cylindrical shape and without undercuts so that all the components which are necessary in the piston-cylinder assembly can be inserted axially into the outer tube. The components may be threaded axially one behind the other in the outer tube and secured or the individual elements of the pump may project through the base and the outer tube into the interior in order to hold certain individual parts in position in this way.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figures 1, 2:
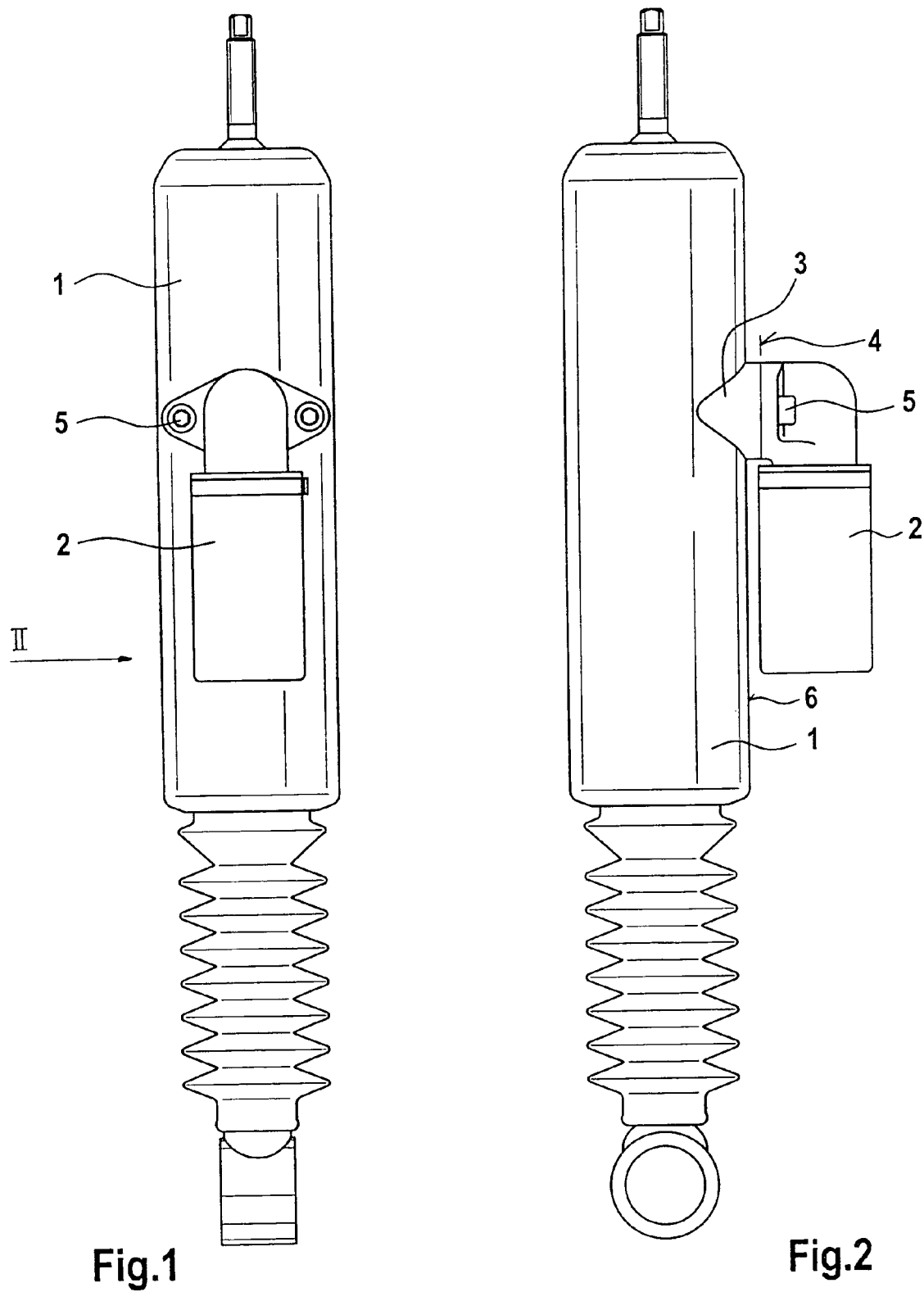
FIG. 1 is a side view of a suspension system according to the present invention.
FIG. 2 is a side view of the suspension system in FIG. 1 from the direction indicated by the arrow labeled II.

FIGS. 1 and 2 show a suspension system 1 in which a base 3 is connected to an outer tube 6 and a pump 2 is secured to the base 3. The pump 2 is fastened to the base 3 by fastening screws 5 on a flange face 4 of the base 3.

The pump 2, together with its drive unit, is arranged in a suspended position in FIGS. 1 and 2. However, the pump 2, together with the drive unit, may alternatively be arranged at the top of, i.e., above, the base 3.

Figure 3:
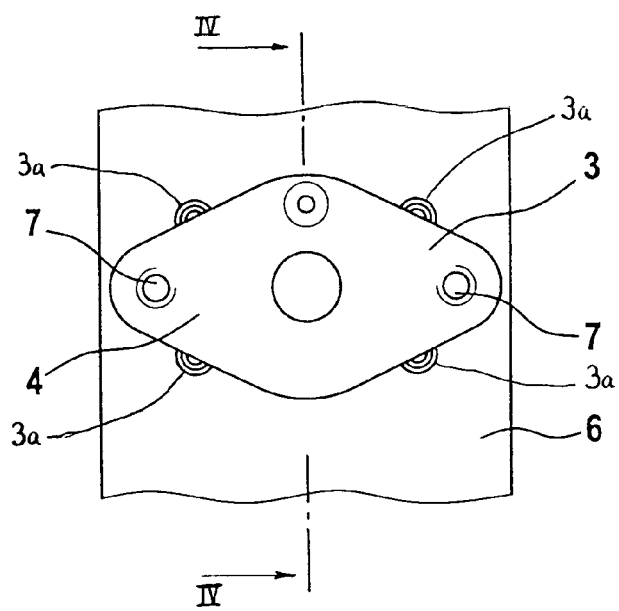
FIG. 3 is a view of a portion of the outer tube of the suspension system in FIG. 1 with a base.
Figure 4:
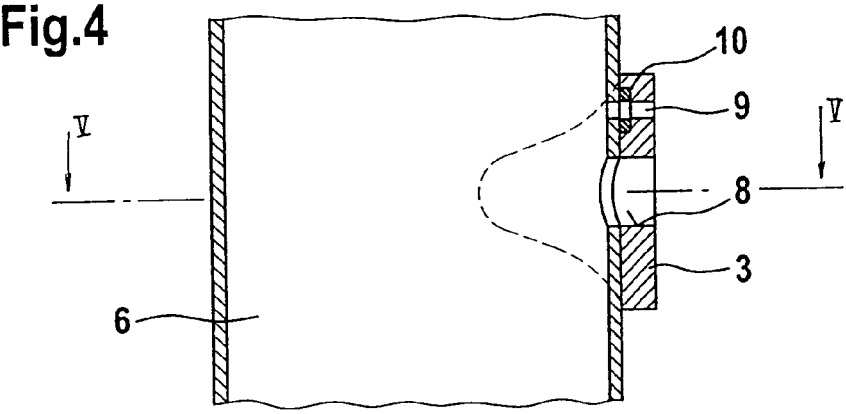
FIG. 4 is a partial sectional view the outer tube and base along line IV-IV in FIG. 3.
Figure 5:
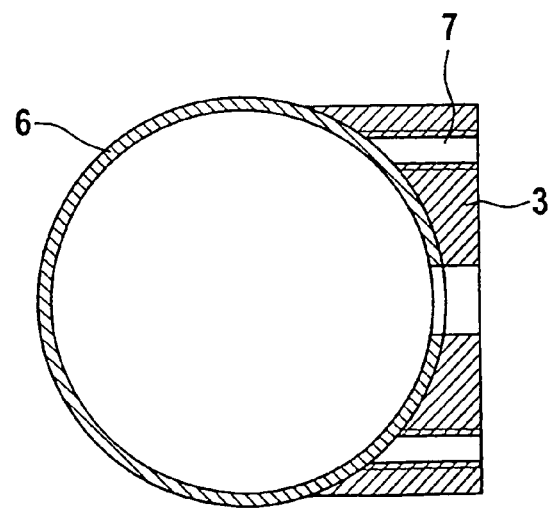
FIG. 5 is a sectional view of the outer tube and base along line V-V in FIG. 4.

FIG. 3 shows a section of outer tube 6, wherein the base 3 is connected to the outer tube 6 by spot welds 3a. Threaded drilled holes 7 for fastening the pump 2 are provided in the flange face 4 of the base 3. FIG. 4 is a side view of the base 3 and outer tube 6 of FIG. 3 and FIG. 5 is a plan view thereof. The base 3, which is adapted to the outer tube 6, may be positioned and centered before welding so that the central drilled hole 8 of the base 3 is held. As described below, the central drilled hole 8 receives the pump 2. As further described below, the central drilled hole 8 of the base 3 does not need to be sealed with respect to the central drilled hole of the outer tube 6. However, a drilled hole 9, the purpose of which is described below, is provided with a seal 10 with respect to the outer tube 6. After the base 3 has been welded to the outer tube 6, the drilled hole 9 is sufficiently sealed.

FIG. 5 shows the outer tube 6 together with the base 3 in section, the threaded drilled holes 7 penetrating the entire base 3 in this exemplary embodiment. As an alternative, these threaded drilled holes 7 may also be embodied as threaded blind holes which are less sensitive to rust.

Figure 6:
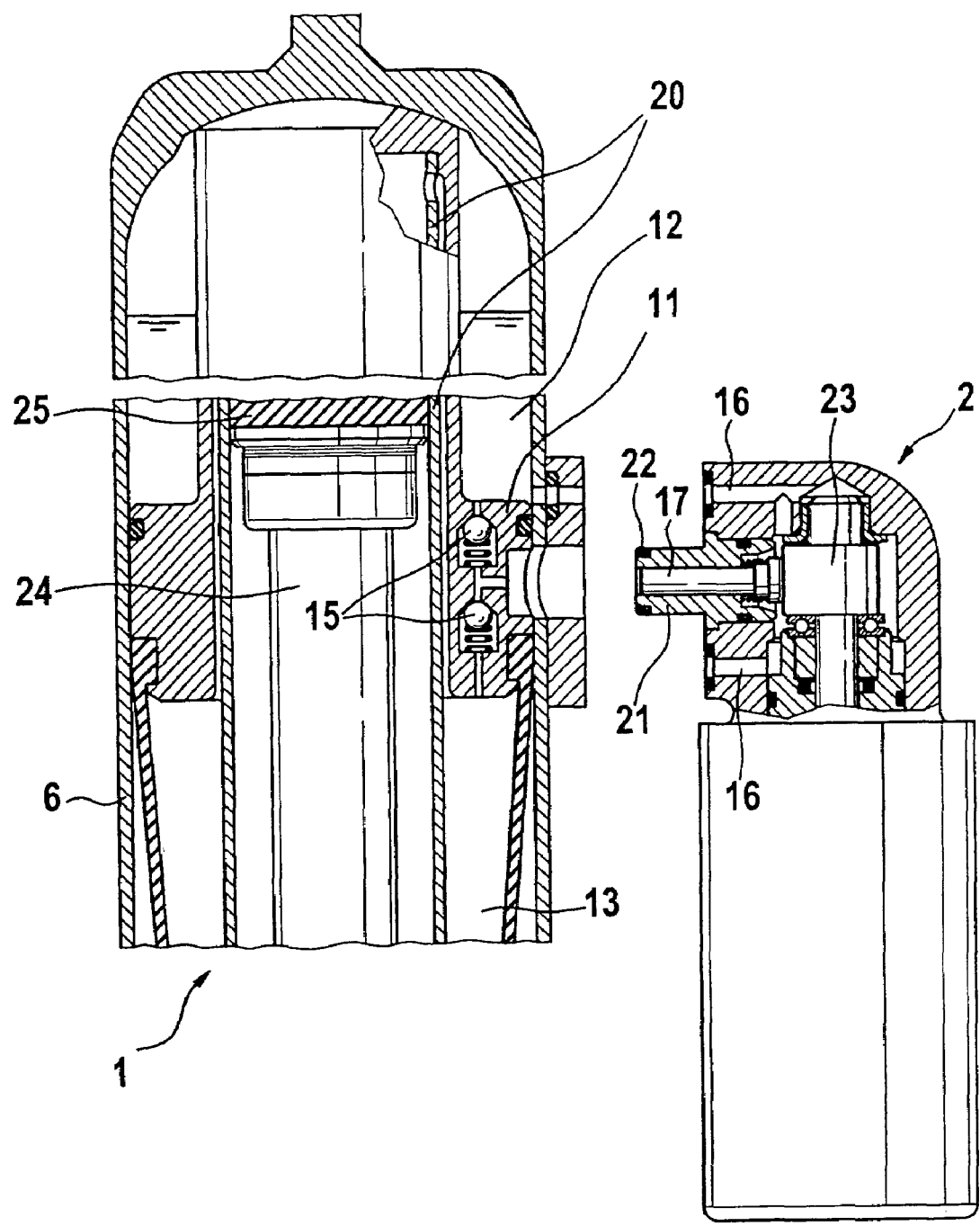
FIG. 6 is a partial sectional view of a suspension system and a pump according to the present invention.

FIG. 6 is a sectional view of the suspension system 1 including a working cylinder 20, a piston rod 24 and a piston 25 being arranged inside the outer tube 6. A dividing wall 11 may be inserted axially into the outer tube 6 as the outer tube 6 is constructed so as to be cylindrical and free of undercuts. The dividing wall 11 divides the space between the working cylinder 20 and outer tube 6 into a low pressure space 12 and a high pressure space 13.

The central drilled hole 8, as shown in FIG. 4 not only penetrates the outer tube 6 but also partially continues in the dividing wall 11 so that a cylindrical shoulder 21 of the pump 2 can engage into the dividing wall 11 and is sealed through appropriate provision of an O ring 22 so that no seal at all has to be provided in the central drilled hole 8 of the base 3. A pump piston 17 is arranged in the cylindrical shoulder 21 of the pump 2. The ducts 16 which are located in the pump 2 and which are also sealed with respect to the base 3 by means of static seals have the purpose of feeding back a leakage oil flow which is fed back into the oil reservoir from the rear side of the pump piston. This not only makes the friction of the pump piston lower but also brings about permanent lubrication of the other moveable parts, for example an eccentric 23 of the pump which acts on the pump piston 17.

Figure 7:
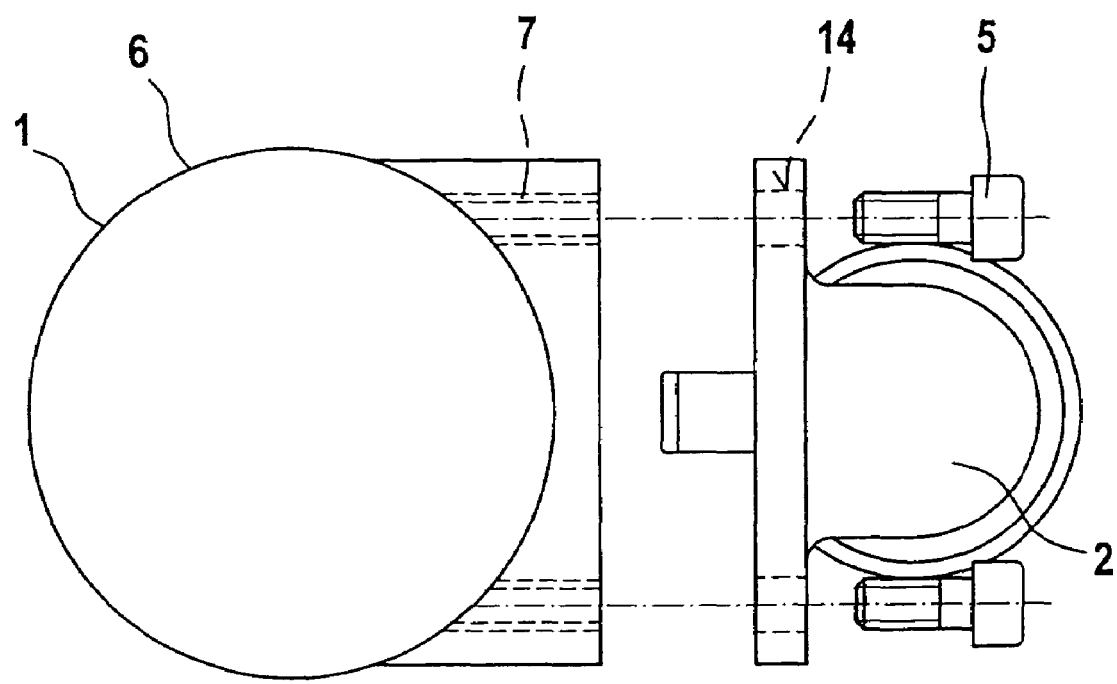
FIG. 7 is a plan view of the pump, base and outer tube of FIG. 6.

FIG. 7 shows the fastening screws 5 used for securing the pump 2 to the base 3. The flange through holes 14 of the housing of the pump 2 have a corresponding passage diameter for compensating tolerances with respect to the fastening screws 5 and the threaded drilled holes 7.

Figure 8:
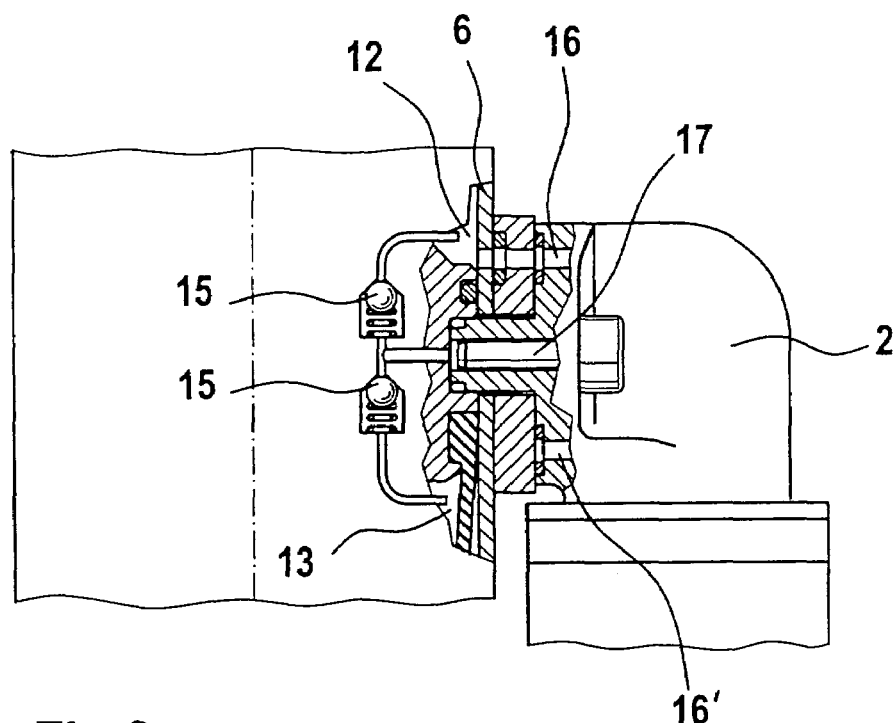
FIG. 8 is a partial sectional view of a pump connected to the base on the outer tube in a first position.

FIG. 8 shows a partial sectional view of the suspension system in which the pump 2 is correspondingly secured to the outer tube 6. The schematically illustrated non return valves 15 trigger the pumping process as the piston 17 moves axially to and fro in order to feed damping agent from the low pressure space 12 into the high pressure space 13. As a result, the piston rod 24 (see FIG. 6) of the suspension system 1 is moved in order to regulate the level. The upper duct 16 connects the low pressure space 12 to the interior of the housing of the pump 2 for the purpose of pressure equalization or lubrication and cooling the drive. A lower duct 16' is sealed with respect to the base 2 in this position of the pump 2 as a blind drilled hole.

Figure 9:
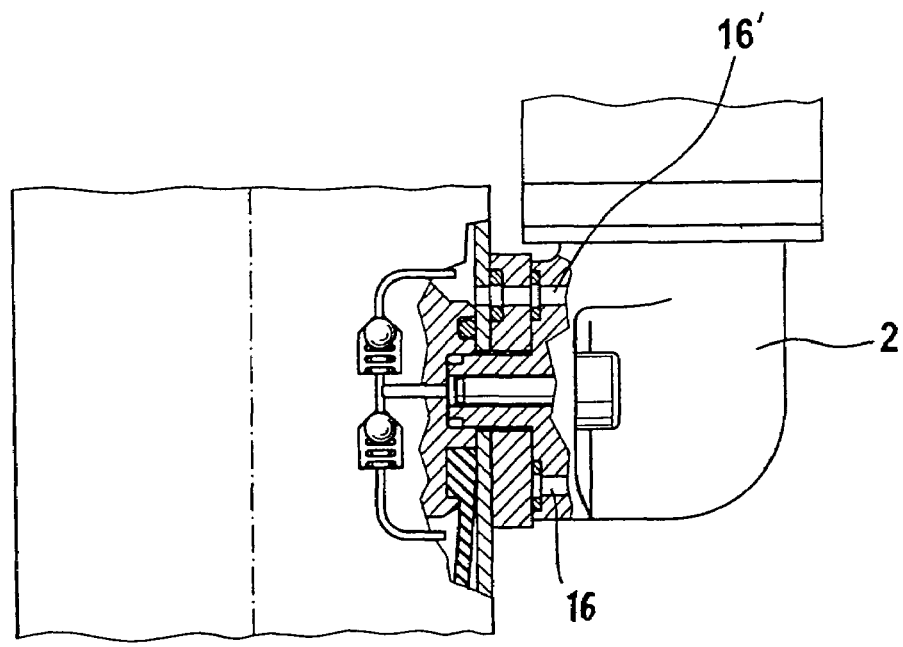
FIG. 9 is a partial sectional view of a pump connected to the base one the outer tube in a second position.

FIG. 9 shows the connection of the pump 2 to the outer tube 6 in the pump 2 is offset by 180° relative to the position shown in FIG. 8 so that the duct 16' now brings about the connection between the low pressure space 12 and the interior of the housing of the pump, while the duct 16 which was previously functioning is closed.

Figure 10:
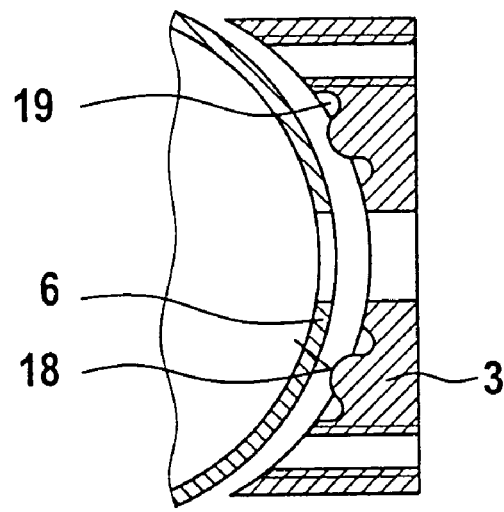
FIG. 10 is a detailed partial sectional plan view of the base and outer tube prior to welding.
Figure 11:
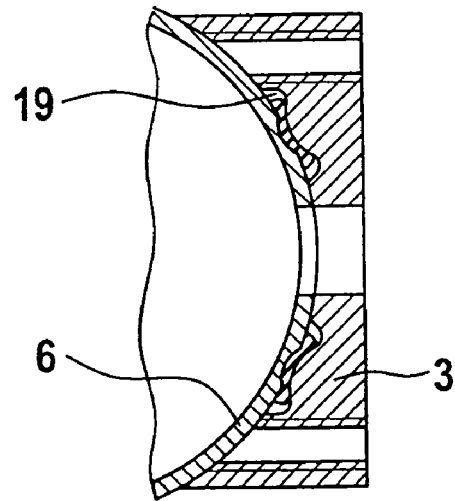
FIG. 11 is a detailed partial sectional plan view of the base and outer tube of FIG. 10 after welding.

FIG. 10 shows the base 3 and outer tube 6 prior to making a welded connection between the base 3 and outer tube 6, the welding bulge 18 of the base 3 being formed elevated in the non welded state with respect to the surrounding surface. FIG. 11 shows the base 3 and the outer tube 6 after the welding process. The welded material flows into the depressions 19 so that a flat abutment is produced between the base 3 and the outer tube 6. This so-called concealed weld does not permit any external impurities so that no preparatory work is necessary before the surface of the suspension system is coated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suspension system for a motor vehicle body having a level regulating device for setting a predetermined height of the motor vehicle body, comprising:

an outer tube;

at least one piston-cylinder assembly arranged in said outer tube and having a working cylinder, a piston rod and a damping piston having damping valves;

an oil reservoir;

inflow and outflow lines for conducting a flow of oil between said oil reservoir and said at least one piston-cylinder assembly;

a pump including a pump piston and a drive arranged for pumping oil through said inflow and outflow lines for setting the predetermined height of the motor vehicle body; and a base sealingly arranged on said outer tube, wherein said pump is mountable to said base in at least two different mounting positions, wherein said pump is configured so that said pump is operable in each of said at least two different mounting positions for pumping oil through said inflow and outflow lines for setting the predetermined height of the motor vehicle body, at least one duct being provided in said pump for each of said at least two different mounting positions, the at least one duct associated with the current one of said at least two mounting positions being connected to said at least one piston cylinder assembly and all other ones of said at least one duct ending at said base as blind lines.

2. The suspension system of claim 1, wherein said base is at least partially welded to said outer tube.

3. The suspension system of claim 2, wherein said base is spot welded to said outer tube.

4. The suspension system of claim 1, wherein each of said at least one duct includes a seal for connection ducts arranged between said pump and said base.

5. The suspension system of claim 1, wherein said pump is mountable to said base by threaded fasteners.

6. The suspension system of claim 1, wherein said outer tube comprises an inner wall which extends cylindrically and without undercuts so that all components of said piston-cylinder assembly are axially insertable into said outer tube when said base is sealingly arranged on said outer tube.

7. The suspension system of claim 1, wherein said at least two different mounting positions include first and second mounting positions, wherein said pump is rotatable about an axis of rotation by a predetermined angle from said first mounting position to said second mounting position.

8. The suspension system of claim 7, wherein the predetermined angle is 180 degrees.

* * * * *